March 23, 1954 H. WEIGOLD ET AL 2,672,914
METHOD OF MAKING PNEUMATIC TIRES
Filed June 21, 1951 5 Sheets-Sheet 1

INVENTOR.
HAROLD WEIGOLD
DORR J. HINMAN
BY James J. Long
Agent

March 23, 1954  H. WEIGOLD ET AL  2,672,914
METHOD OF MAKING PNEUMATIC TIRES
Filed June 21, 1951  5 Sheets-Sheet 2

INVENTOR.
HAROLD WEIGOLD
DORR J. HINMAN
BY James J. Long
Agent

March 23, 1954  H. WEIGOLD ET AL  2,672,914
METHOD OF MAKING PNEUMATIC TIRES
Filed June 21, 1951  5 Sheets-Sheet 3

INVENTOR.
HAROLD WEIGOLD
DORR J. HINMAN
BY
James J. Long
Agent

March 23, 1954 — H. WEIGOLD ET AL — 2,672,914
METHOD OF MAKING PNEUMATIC TIRES
Filed June 21, 1951 — 5 Sheets-Sheet 4

INVENTOR.
HAROLD WEIGOLD
DORR J. HINMAN
BY James J. Long
Agent

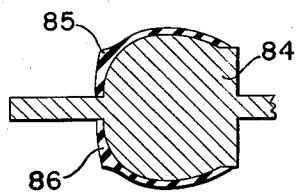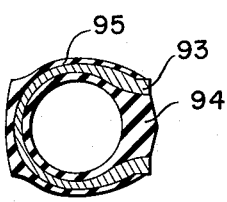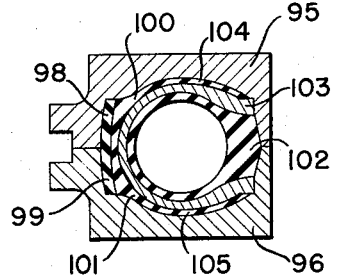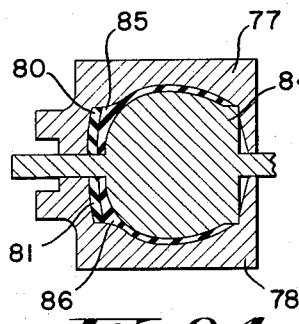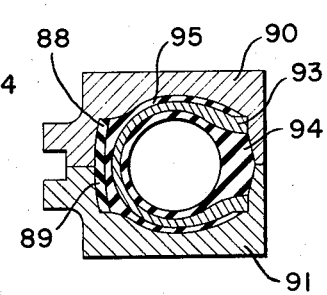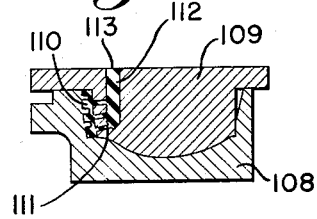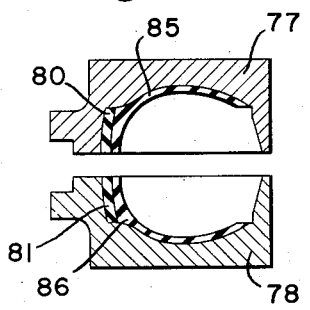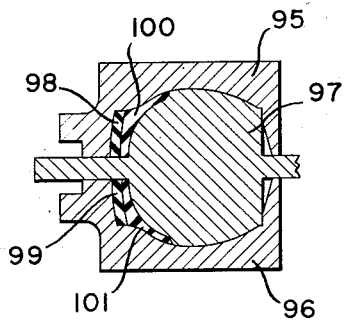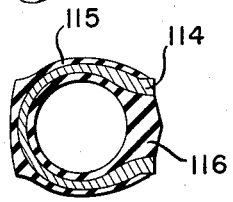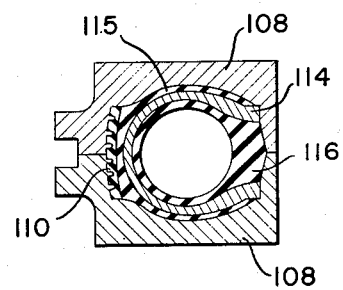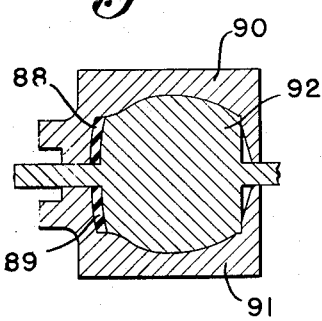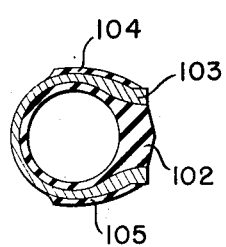

Patented Mar. 23, 1954

2,672,914

UNITED STATES PATENT OFFICE 2,672,914

METHOD OF MAKING PNEUMATIC TIRES

Harold Weigold, Grosse Pointe Woods, and Dorr J. Hinman, Detroit, Mich., assignors to United States Rubber Company, New York, N. Y., a corporation of New Jersey Application June 21, 1951, Serial No. 232,682

20 Claims. (Cl. 154—14)

This invention relates to an improved method of making pneumatic tires, and more particularly the invention relates to improvements in the compression molding of pneumatic tires.

A principal object of the invention is to provide an improved method of making pneumatic tires by compression molding.

A further object is to provide a method of compression molding pneumatic tires which permits various portions of the tire to be made from different kinds of rubber stock for optimum performance of the tire, coupled with economy.

Another object is to provide a method of compression molding pneumatic tires which permits the use of conventional unit vulcanizer type of curing equipment for curing of the tires.

A further object of the invention is the provision of a method of compression molding tires which simplifies the equipment and makes possible the most efficient use of the equipment.

Still a further object of the invention is the provision of a method of forming tire treads which insures that the tread will be uniform around the circumference of the tire, thereby eliminating the "thump," unbalance, and undesirable riding characteristics sometimes encountered in pneumatic tires in which the tread portion has been formed by conventional methods.

The manner in which the invention accomplishes the foregoing objects, and additional objects and advantages, will be made evident in the following detailed description of the invention, which is intended to be read with reference to the accompanying drawings, wherein:

Figs. 11 to 34 are fragmentary sectional views on a smaller scale showing modified methods of molding the assemblies according to the invention.

Figure 1:
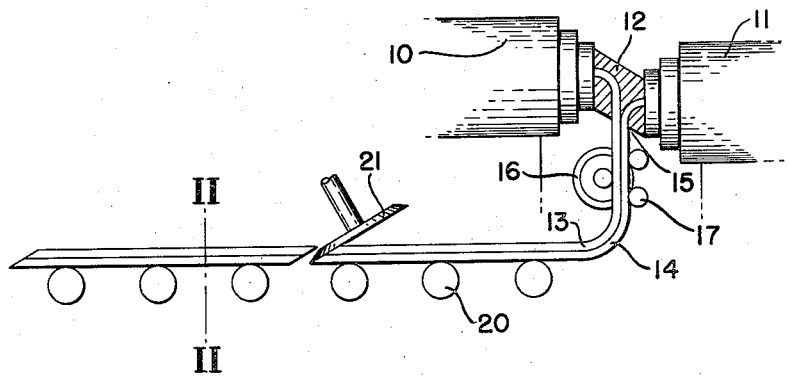
Fig. 1 is a largely schematic side elevational view of an apparatus for preforming a rubber tire tread in accordance with one method of carrying out the invention.

The invention contemplates forming an approximate "preform" of a tire tread from a plurality of rubber stocks, for example, from a tread stock having high abrasion resistance and an adjacent sidewall stock of softer and more flexible composition. Typically, the invention employs two different stocks, the one stock referred to as the base stock, forming the tire sidewalls and under-tread portion, and the other stock, known as the cap stock, forming the tread portion proper, that is, the central road-contacting portion of the tire casing.

However, the invention is not limited to the use of two stocks, but may employ as many different stocks as desired to provide the desired characteristics in various parts of the tire. Most usually, however, the invention is employed with the "cap and base" construction described, using two stocks. The various stocks in the preform are located in positions corresponding essentially to the desired location of the stock in the final tread, and the general size and shape of the portions of stock correspond roughly to their size and shape in the final tire tread. Such preforms, in the form of an annular band representing a transaxial part, usually a transaxial half, of the tire tread, are molded under the influence of heat and pressure in a suitable mold into close conformation to tire shape. This operation produces a flowing and compacting of the rubber stock into the desired shape with the result that all irregularities of thickness or density of the stock are substantially eliminated. In order that the mold parts may be constructed symmetrically and may be interchangeable and in order to shape the preforms in the simplest manner, it is generally preferred that the preforms each represent a transaxial half of the tire tread. However, if desired, the preforms may represent unequal portions of the tire, e. g., one preform may have a size and shape corresponding to 60% of tread and another preform of suitable shape may constitute the remaining 40% of the tread, it being understood that the mold parts in which the preform is molded are shaped and proportioned accordingly.

The mold employed at this stage is essentially smooth surfaced, that is, there is no provision in the mold surface for forming the usual tread pattern. A purpose of this is to avoid undue or objectional flow of the stock, with consequent intermingling of the various stocks and displacement of the stocks from their desired relative positions, which might take place, particularly if this mold had a deep tread pattern therein. Having thus formed the tire tread in transaxial parts, generally in two transaxial halves, the tread halves are applied to a previously prepared tire carcass, which may be prepared in band form on a tire building drum in the usual manner and shaped in annular toroidal form with the aid of the usual vacuum shaping box, wherein a curing bag is inserted in the carcass. The assembly of tread, carcass, and curing bag may then be placed in a final shaping and curing mold having the desired anti-skid pattern in its surface, and vulcanized in final shape.

Figure 2:
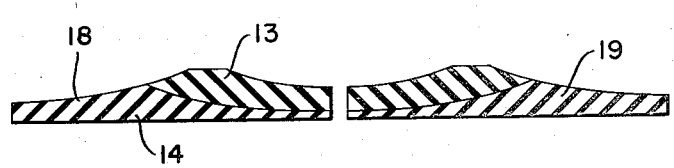
Fig. 2 is a transverse sectional view taken along the line 2—2 of Fig. 1 of a preformed tire tread split longitudinally into two equal sections.

Referring to the drawings, Fig. 1 shows an arrangement of two opposed heated extrusion devices 10 and 11 which are adapted to deliver through a common die head 12 two different streams of rubber stock, the one stream 13 being composed of abrasion resistant tread stock, and the other stream 14 being composed of sidewall stock. The exit orifice 15 of the die 12 has the approximate cross-sectional shape of a tire tread assembly, and the streams 13 and 14 are united firmly together as they stream through the die orifice. On emerging from the die the tread is split longitudinally, usually along its centerline, to produce two tread parts 18 and 19, as indicated most clearly in Fig. 2. This splitting may be accomplished in the die or after the tread leaves the die, by means of a knife 16 or the like while the tread is in engagement with back-up rollers 17. The split tread advances onto the rollers 20 of a conveyor, and is cut transversely at intervals by any suitable means, such as a rotating knife 21, into sections approximating in length the circumference of the desired tire tread. Opposite ends of such lengths are then spliced together, as by cementing, to form annular bands or preforms, each representing a transaxial fractional part, in this case a transaxial half, of the tire tread and containing the proper quantity or weight of rubber stock.

Figure 3:
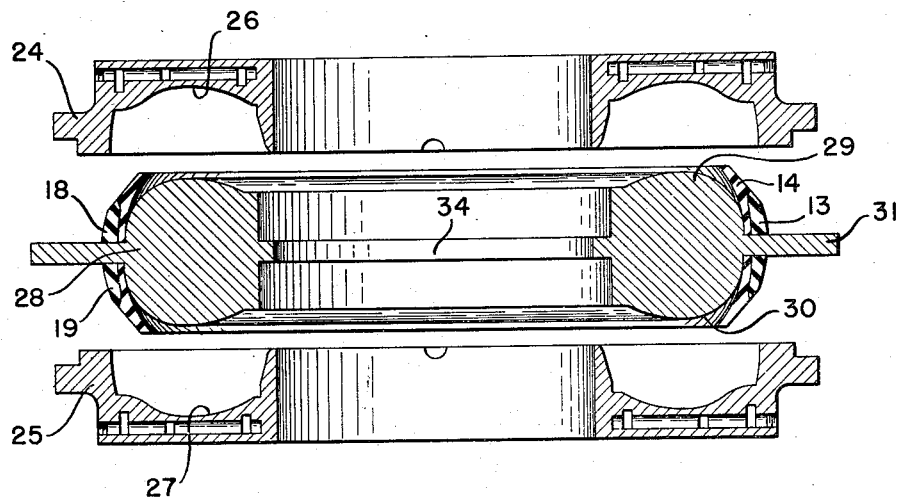
Fig. 3 is a transverse sectional elevational view of a mold, in the open position, for molding the preform.
Figure 4:
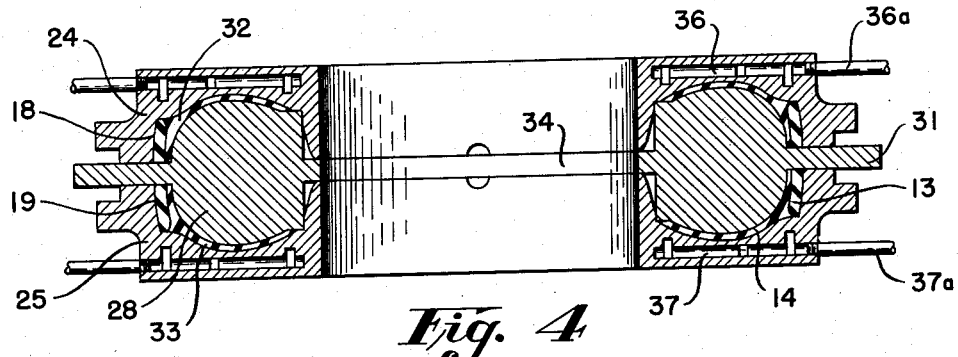
Fig. 4 is a similar view of the mold of Fig. 3 in the closed position and showing means for circulating a cooling medium therethrough.

The preforms are then molded in a mold comprising, as shown in Figs. 3 and 4, upper and lower mold halves or shells 24 and 25, each having on its inner face an annular recess 26, 27 corresponding in outline to the external contour of the tire tread except that the mold surfaces are of essentially smooth contour, that is, no provision is made in the mold surface for forming an anti-skid tread pattern on the tire surface. A cooperating annular core piece 28 is adapted to be disposed between the upper and lower mold halves and is provided with upper and lower protruding faces 29, 30 having the contour of a tire carcass and separated by an external radially extending flange member 31.

One of the preforms 18, 19 is applied to each of the core surfaces 29, 30 as indicated in Fig. 3. In practice the bands or preforms 18, 19 are usually made slightly undersize with respect to their circumference and they are stretched when applied to the core members so that they cling to and substantially conform to the surfaces of the core members. The mold halves or shells 24 and 25 are then brought together against the core piece to enclose the preforms, as indicated in Fig. 4, in mold cavities 32, 33, each having the shape of a transaxial half of the tire tread. In the closed position, the upper and lower surfaces of the external core flange 31 are engaged by opposing edges of the mold, while the inner edges of the mold engage a small internal flange 34 on the core 28.

The preforms 18 and 19 are preferably at a suitable elevated temperature, e. g., 200° F., when they are placed on the core piece 28. Ordinarily, the preforms will retain sufficient heat from the previous extrusion operation to be at this temperature but if not the temperature can be raised by applying heat thereto. It is also preferable that the core piece be preheated to an elevated temperature, e. g., 200° F. The mold halves 24, 25 are also preheated to an elevated temperature, e. g., approximately 250° F., as by circulating a heated fluid medium from an external source (not shown) through internal passages 36, 37 in the body of the mold halves. It will be understood that the mold halves may be brought together against the core under pressure by the usual hydraulic press (not shown). Under the influence of heat and pressure the rubber stock flows into uniform shape in conformity with the wall of the cavities 32, 33. However, the relative positions of the tread stock proper 13, and the sidewall stock 14 are not disturbed during this molding operation.

With the mold in the closed position, cooling fluid is then circulated through the mold passages 36, 37 as, for example, by conduit means 36a and 37a (Fig. 4) until the temperature of the mold has been reduced to about 150° F. The purpose of this cooling is to prevent the stresses set up during the molding operation from causing shrinkage of the tread stock when the pressure is released. This prevents the tread stock from separating from the mold when the mold is opened.

In order that the preformed tread will adhere to the mold halves as the mold is opened, rather than to the core, the core is surfaced in such manner that its adhesion to the rubber stock is relatively small. For this purpose it has been found preferable that the surface of the core be chromium plated and highly polished. However, if desired, the core surface may be coated with a mold lubricant to prevent the stock from sticking thereto.

Figure 5:
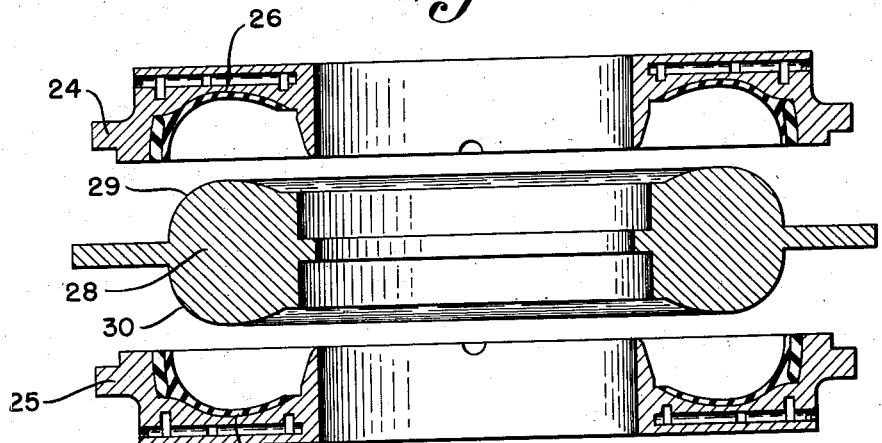
Fig. 5 is a view showing the mold open for removal of the core.
Figure 6:
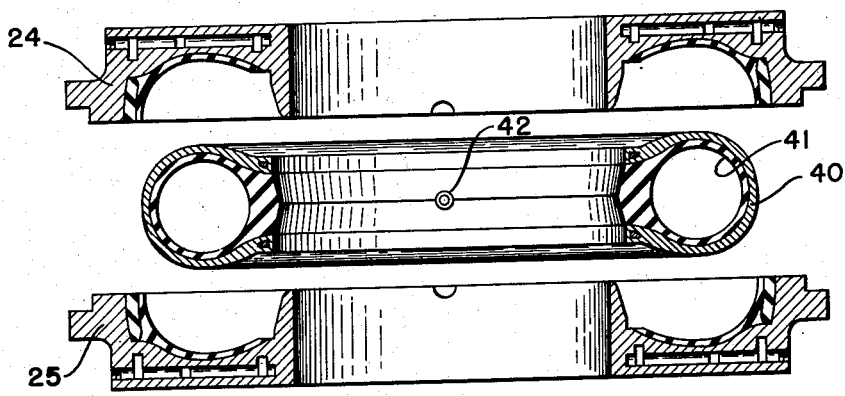
Fig. 6 is a similar view of the mold in the open position with a tire carcass containing a curing bag in process of being inserted in the mold.

The mold is then opened and the core 28 removed, leaving the formed tread segments in the mold shells as shown in Fig. 5. There is then inserted in the mold a shaped tire carcass 40, containing a curing bag 41, as indicated in Fig. 6. The tire carcass may be built up previously in the form of an annular band on a collapsible tire building drum by superimposing a plurality of plies of rubber tire fabric and incorporating the usual inextensible bead elements in the marginal edges of the band. The band is then shaped into annular toroidal form in a vacuum shaping box and the curing bag 41 is inserted therein. The curing bag 41 is made of extensible, heat resistant material, such as butyl rubber, and is formed with an external contour corresponding to the internal shape of the tire carcass, and is also provided with an inlet opening 42 in the rim portion thereof.

Figure 7:
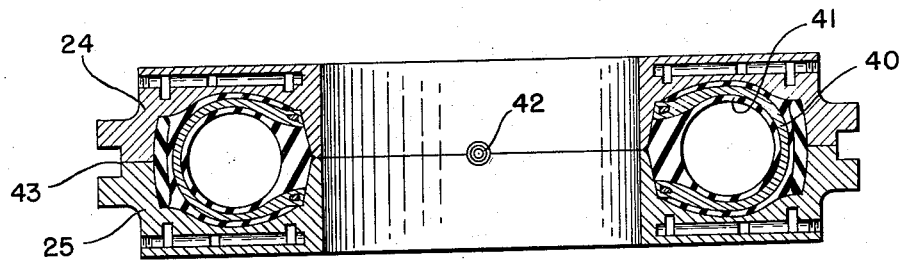
Fig. 7 is a similar view showing the mold in the closed position for uniting the formed tread to a tire carcass.

The mold halves 24, 25 are closed over the assembly of curing bag and carcass, as indicated in Fig. 7, and the bag 41 is inflated through the inlet opening 42, thereby causing the carcass to expand into contact with, and to adhere to, the tread segments. The temperature of the tread segments at this stage of the operation will generally be about 150° F. and the temperature of the carcass is usually about 200° F. The elevated temperature facilitates expansion of the carcass and permits the carcass cords to readjust themselves as the carcass is expanded against the tread segments. Usually the pressure applied within the curing bag at this stage will be within the range from 60 to 250 p. s. i. Satisfactory results have been obtained by maintaining a pressure of about 90 p. s. i. for a period of from 15 seconds to 3 minutes. To avoid entrapping air between the carcass and the tread, it has been found preferable to first bring the mold to within about ⅛ inch of being completely closed, and then inflate the bag to drive out the air from between the carcass and the tread, and thereafter close the mold completely. This operation also causes the two transaxial halves or segments of the tread to be spliced together along a circumferential line 43 corresponding to the parting line of the mold.

The mold is thereafter opened, and because of the greater adhesion of the tread to the carcass than to the mold halves, the tread separates from the mold and remains on the carcass. It has been found that satisfactory results are obtained by employing an unpolished chromium plating, that is, a generally matte finish chromium, on the mold or shell surfaces. In preparing the mold surfaces they are first vapour blasted and then chromium plated and the surface is left unpolished. The surface thus produced has less adhesion for the rubber than has the tire carcass, but at the same time the surface has greater adhesion to the rubber than the polished chrome plating on the core piece 28, so that the tread remains in the mold halves as shown in Figs. 5 and 6, rather than on the core when the mold is opened after the preforming operation indicated in Fig. 4. If desired, the mold shell surfaces, in place of being unpolished chromium, may be otherwise treated to provide this differential adhesion characteristic.

Figure 8:
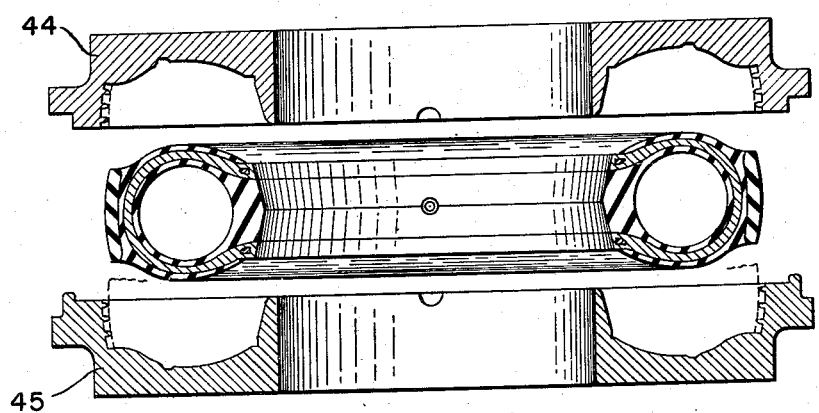
Fig. 8 is a view showing the united tread and carcass being inserted in the final shaping and curing mold.
Figure 9:
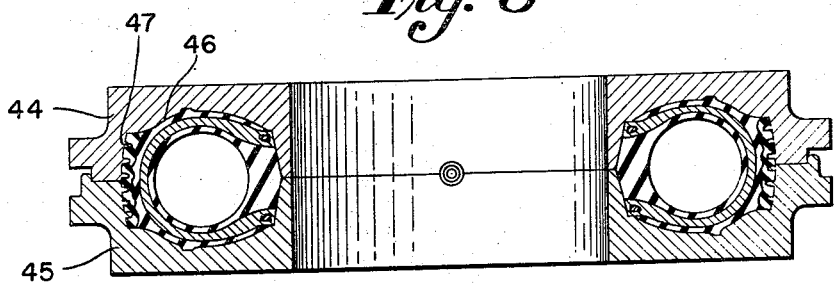
Fig. 9 is a transverse sectional elevational view of the shaping and curing mold with the tire in place for final shaping and vulcanization.

The assembly of tread, carcass and curing bag may then be placed, as indicated in Figs. 8 and 9, in conventional type curing equipment of the pot heater type composed of upper and lower mold halves 44, 45 which define a tire shaped mold cavity 46 having a design 47 in its surface for forming an anti-skid pattern in the tread. With the pot heater type equipment the tire mold 44, 45 is placed in a vulcanizing press wherein it is subjected to heat and pressure sufficient to vulcanize the tire and carcass. It will be understood that at the same time heat and pressure are applied to the interior of the curing bag through the opening 42. Alternatively, the tread and carcass assembly as shown in Fig. 8 may, if desired, be cured or vulcanized in a conventional unit vulcanizer of the McNeil or De Mattia type. The unit vulcanizer, also called the watch-case press or individual vulcanizer, is a well known and commonly used type of vulcanizing press, designed to accommodate an individual tire, as distinguished from the pot heater or autoclave type of vulcanizer, which usually accommodates a large number of tires simultaneously. The use of both of these types of vulcanizing press is outlined at page 577 of "Machinery and Equipment for Rubber and Plastics" (vol. 1, Primary Machinery and Equipment), by R. G. Seaman et al., published by India Rubber World, New York, New York, in 1952, and also at pages 437–8, of "Modern Rubber Chemistry" by H. Barron, published by D. Van Nostrand Company, New York, New York, in 1948.

Figure 10:
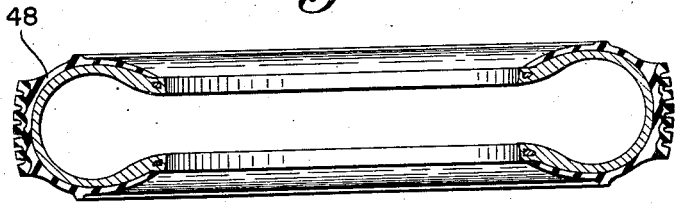
Fig. 10 is a transverse sectional elevational view of the completed tire.

The finished tire 48 after removal from the mold is shown in Fig. 10.

Figure 11:
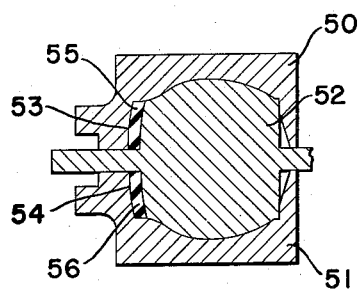
Figure 13:
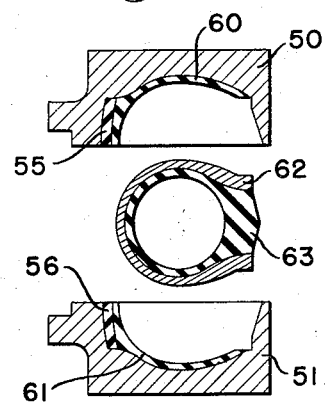
Figure 17:
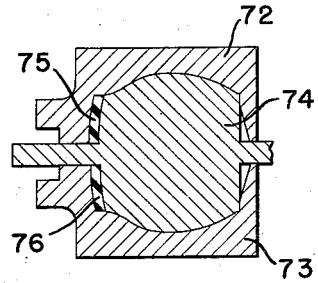
Figure 14:
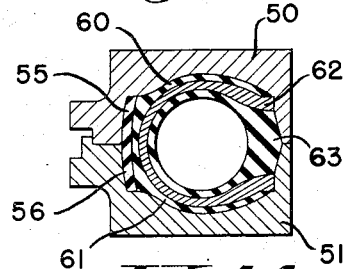
Figure 18:
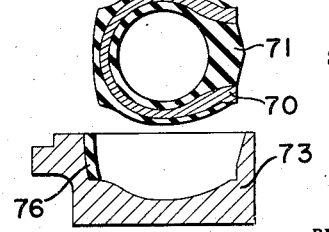
Figure 22:
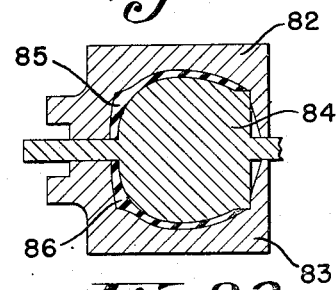

In the modification of the invention shown in Figs. 11 to 14, the desired cap and base construction is achieved by first molding the cap stock in a mold provided with a suitable core, and thereafter removing the core and placing in the mold a second core for molding the base stock. Thereafter, the molded cap and base are united to the tire carcass as described previously. For this purpose, there are provided upper and lower mold shells 50 and 51 which define, with a cooperating core 52, upper and lower mold cavities 53, 54 in an arrangement generally similar to that described in connection with Figs. 3 and 4, except that the present cavities 53, 54 have the shape of the cap portion only of the tire tread. Strips of cap stock, suitably formed by extrusion, preferably in an approximation of the desired shape, are applied in the form of annular bands to the upper and lower surfaces of the core 52, in the same manner as described above in connection with Fig. 3, and the mold halves 50, 51 are brought together to form the cap portion in two transaxial halves 55, 56 within the cavities 53, 54 as indicated in Fig. 11. The mold is thereafter opened and the core 52 is removed leaving the molded cap halves 55, 56 on the interior surface of the shells 50, 51. It will be understood that the surfaces of the core, by reason of being suitably lubricated or plated, have less adhesion to the rubber stock than the surfaces of the shells, so that the molded preforms remain in the shells. After removal of the core 52 there is substituted therefore a second core 57 of such shape that it defines with the mold halves 50, 51 containing the cap halves 55, 56, upper and lower mold cavities 58, 59 having the shape of the base portion of a tire tread. Before placing the core 57 in the mold, strips of base stock, preferably having at least the general contour of the tire sidewall and under tread, and suitably formed by extrusion, are applied in the form of annular bands to the upper and lower surfaces of the core 57. The mold shells 50, 51 are then brought together over the core 57 forming the base portion of the tire tread in two transaxial halves 60 and 61. At the conclusion of this molding operation, the core 57 is removed, leaving the cap portions and the base portions in the mold shells, as indicated in Fig. 13. There is then disposed between the shells a previously prepared assembly of a raw tire carcass 62 and curing bag 63 over which the mold shells are closed to firmly unite the carcass and the base stock halves 60, 61, as indicated in Fig. 14, in a manner similar to that described in connection with Figs. 6 and 7 above. Thereafter, the assembly may be disposed in the usual vulcanizing mold, to complete the manufacture of the tire.

Figure 15:
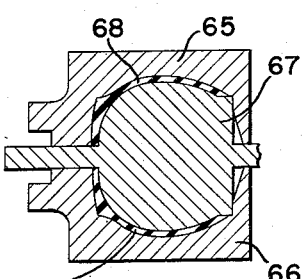
Figure 19:
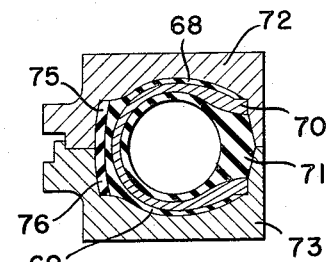
Figure 12:
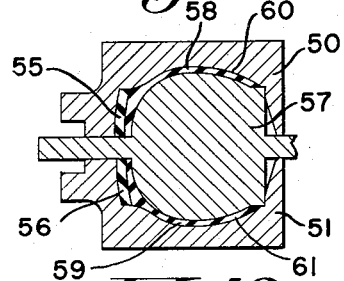
Figure 16:
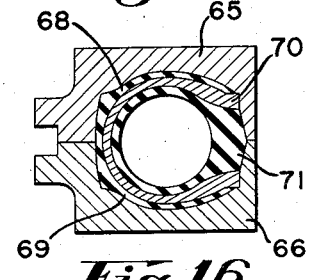

In the modification of the invention shown in Figs. 15 to 19 the base stock is formed in one mold having a suitable core, and then united to the previously prepared carcass. The cap stock is formed in a second mold having a suitable core, and the assembly of base stock and carcass is thereafter substituted for this core to unite the cap stock to the assembly. Referring to Fig. 15, upper and lower mold shells 65, 66 define, with the core piece 67, upper and lower mold cavities in which the base stock is formed in two transaxial halves, 68, 69. The core piece 67 is then removed, and a previously prepared assembly of tire carcass 70 and curing bag 71 is substituted therefor, and the mold halves are brought together to unite the base halves 68, 69 to the surface of the carcass 70. There is also provided a second set of mold halves 72, 73 which define, with a cooperating core piece 74, cavities having the shape of transaxial halves 75, 76 of the cap portion of the tire casing. After thus molding the cap portions 75, 76 the mold is opened and the core 74 is removed and the assembly of curing bag 71, carcass 70 and base portions 68, 69 is disposed between the mold halves 72, 73 to unite the cap portions 75, 76 to each other and to the base portion 68, 69, as indicated in Fig. 19. After this molding operation, the vulcanization may be carried out in a suitable mold in the usual manner.

Figure 20:
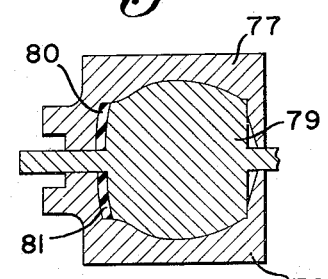
Figure 21:
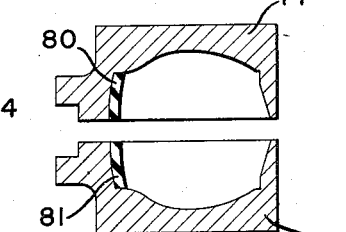

In the modification of the invention shown in Figs. 20 to 25 the cap stock is formed between one set of molds and cooperating core, while the base stock is formed between a second set of molds with a second cooperating core. The adhesion of the base stock to the second core is greater than its adhesion to the mold shells, and the second core carrying the base stock is disposed within the first mold to unite the base stock to the cap stock. Thereafter, the second mold is removed leaving the cap and base stocks in the mold shell, and the assembled carcass and curing bag may then be united thereto in the manner described in connection with the previous forms of the invention. Referring to Fig. 20, mold halves 77, 78, together with core 79 serve to shape the cap stock in two transaxial halves 80, 81, which remain in the mold shells when the core 79 is removed, as indicated in Fig. 21. A second pair of mold halves 82, 83 with a cooperating core 84 is employed to mold the base stock in two transaxial halves 85, 86. The adhesion of the base halves 85, 86 to the core 84 is greater than their adhesion to the surface of the mold shells 82, 83, and therefore when the mold is opened and the core 84 is removed, the base halves 85, 86 remain on the surface of the core 84, as indicated in Fig. 23. The core 84 is then disposed between the mold halves 77, 78 carrying the cap halves 80, 81, and these mold halves are brought together to unite the cap stock to the base stock, as indicated in Fig. 24. The adhesion of the base stock to the mold halves 77, 78 is greater than its adhesion to the core piece 84, so that when the mold is opened as indicated in Fig. 25 the cap and base stocks remain within the mold shell. A previously assembled curing bag and carcass may then be disposed between the mold shells 77, 78 to unite the rubber stock to the carcass, and thereafter the assembly may be vulcanized in the usual manner.

The modification of the invention shown in Figs. 26 to 28 contemplates assembling portions of the rubber covering of the tire casing while still on the tire building drum, and thereafter uniting the tire carcass carrying such portions to further molded preform portions of the tire casing. Referring to Fig. 26 the cap portion of the tire is molded in two transaxial halves 88, 89 between mold shells 90, 91 and a core piece 92. There is then provided a tire carcass 93 containing in its interior a curing bag 94, and having applied to its exterior surface a layer of base stock having the general shape of the tire undertread and sidewall portions. It will be understood that the base stock may be shaped in any suitable manner, such as by extrusion, and applied to the surface of the carcass while the carcass is carried on the usual tire building drum, in essentially the same manner that a tire tread is ordinarily united to a tire carcass on the building drum. This assembly of curing bag 94, carcass 93 and base stock 95 is substituted for the core piece 92 within the mold shells 90, 91 as indicated in Fig. 28, thereby uniting the cap portions 88, 89 to the surface of the base stock 95.

In Fig. 29, mold halves 95, 96 are arranged with a core piece 97 for molding cap portions 98, 99 with base portions 100, 101 in much the same manner as described above in connection with Figs. 3, 4, except that the base stock extends only partially down the sidewall of the tire, and suitably extends approximately as far as the buffing rib of the tire. There is then prepared an assembly of curing bag 102, carcass 103 and lower sidewall portions 104, 105 which may be formed in any suitable manner, as by calendering or by extrusion, and applied to the surface of the carcass, conveniently on the tire building drum. This assembly is substituted for the core piece 97 between the mold halves 95, 96, as indicated in Fig. 31 to effect union of all of the parts, and thereafter the entire assembly may be vulcanized in a suitable mold. This form of the invention is particularly adapted for making tires with white sidewalls, or other special stock in the sidewalls, since the sidewall portions 104, 105 may either or both be made from white stock, or other special desired stocks.

In appropriate cases, particularly where the mold shell and core define, at a given stage in the molding operation, a mold cavity designed to contain only one type of rubber stock, say either tread stock or base stock, it may be desirable to charge such mold cavity by injecting the stock thereunto. If desired, when the mold cavity intended to contain the tread stock is charged by injection, the mold shell may contain a suitable tread pattern. When this is done, the mold shell may if desired become part of the final vulcanizing mold. Alternatively, a raw tire casing, molded with the aid of such a mold shell containing a tread pattern, may be removed from the forming mold for cure in open steam. A modification of the invention according to the foregoing practice is illustrated in Figs. 32 to 34. Here, a mold shell 108 defines, with a cooperating core 109, a series of cavities 110 corresponding to the tread projections of the tire. A series of injection passageways 111, pass generally radially from each of the cavities 110 into the body of the core 109, into communication with an injection chamber 112 that opens at an external orifice 113 on the external face of the core. Such orifice 113 is adapted to be engaged by a suitable injection device capable of delivering heated plastic vulcanizable tread rib stock under pressure to charge the cavities 110. There is then provided in any suitable manner a shaped tire carcass 114, as shown in Fig. 33, having applied thereto an external rubber covering 115 constituting the under tread and sidewall portions of the tire and containing a curing bag 116. Two mold shells 108 containing molded ribs in the cavities 110 are brought into engagement with this assembly, as indicated in Fig. 34, to unite the molded ribs to the remainder of the rubber stock by heat and pressure.

From the foregoing it is evident that the invention provides a convenient and economical method for making pneumatic tires. Because of the manner in which the tread is molded from a preform containing different kinds of rubber stock preassembled in the desired relative positions, it is possible to make the various portions of the tire from rubber stocks which are most effective and economical for their particular purpose. Because of the way in which the stocks are preassembled there is no tendency for them to become displaced from their proper positions by the flow of stock which takes place during the molding operations. The molding of the tire tread as a preformed shape results in a uniform, balanced tread. Because there is no transverse splice in the tread, as is the case in tires made in the conventional manner, a primary cause of the irregularity of the tire is removed and tires of superior quality result.

By employing in the preforming operation a mold which is devoid of the usual anti-skid pattern, flow of stock during this stage of the molding operation is minimized so that there is no danger of the various stocks flowing from their proper position and intermingling in an undesired manner. In this way, a final tire is obtained in which the tread stock and the sidewall stock occupy their proper relative positions, even though the tire has been compression molded. A further advantage of employing a smooth surface mold for the preforming operation is that relatively lower pressures are required to effect the compression molding when the tread pattern is absent. This simplifies the equipment necessary for the process. By employing a first mold to mold the preforms, and an additional mold to vulcanize the tire, it is possible to make the most efficient use of the molding equipment. Because the preforms remain in the preforming mold for a relatively short period compared to the length of time the tire remains in the vulcanizing mold, it is possible for a limited number of preforming molds to supply a larger number of vulcanizing molds. Since the preforming mold requires a relatively heavy press to supply the required forming pressure it represents a comparatively expensive type of equipment, and it is therefore a distinct economy to be able to use the minimum number of such molds to supply the vulcanizers.

As indicated previously, the invention provides, on the preforming molds, a mold shell surface which has greater adhesion to the rubber stock than the core surface has to the stock. This permits the preformed tread segments to remain with the mold shells when the mold is opened. At the same time, the adhesion of the mold shell surface to the rubber stock is less than the adhesion of the stock to the carcass. As a result, the molding and assembling operations are carried out conveniently and efficiently, producing a well formed tire.

The molding methods described herein may employ to advantage the mold rotation process described in the co-pending application of D. J. Hinman, Serial No. 232,683, filed of even date herewith and assigned to the same assignee as the instant application.

Having thus described our invention, what we claim and desire to protect by Letters Patent is:

1. A method of making pneumatic tires comprising extruding a plurality of vulcanizable rubber tire stocks in the relative positions which such stocks occupy in the finished tire, forming said assembly into an annular band corresponding to a transaxial section of the tire, subsequently molding said band in annular form with an essentially smooth surface devoid of anti-skid pattern, disposing a tire carcass between two of such molded forms, and heating the resulting assembly under pressure in tire shape to effect vulcanization thereof.

2. A method of making pneumatic tires comprising assemblying a rubber tire tread stock and a rubber sidewall stock in the relative positions which such stocks occupy in the finished tire, forming said assembly into an annular band corresponding to a transaxial portion of the tire tread, subsequently compression molding said band in annular form with an essentially smooth surface devoid of anti-skid pattern, disposing a tire carcass between two of such compression molded forms, and heating the resulting assembly under pressure in tire shape to effect vulcanization thereof.

3. A method of making pneumatic tires comprising assemblying a plurality of vulcanizable rubber tire stocks in the relative positions which such stocks occupy in the finished tire, forming said assembly into an annular band corresponding to a transaxial section of the tire tread, subsequently compression molding said band with a smooth surface devoid of tread pattern in a first mold, disposing a tire carcass between two of such compression molded forms, and heating the resulting assembly under pressure in tire shape in a second mold having a tread pattern therein to effect vulcanization of the assembly.

4. A method of making pneumatic tires comprising assemblying a rubber tire tread stock and a rubber sidewall stock in the relative positions which such stocks occupy in the finished tire, forming said assembly into an annular band having the approximate cross-sectional shape of a transaxial half of the tire tread, subsequently compression molding said band in annular toroidal form with an essentially smooth surface devoid of anti-skid pattern, disposing a shaped tire carcass containing a curing bag between two of such compression molded forms, and heating the resulting assembly under pressure to effect vulcanization thereof.

5. A method of making pneumatic tires comprising forming a strip of rubber tire sidewall stock and an adjacent strip of rubber tread stock in the relative positions which such stocks occupy in the finished tire, placing a definite quantity of such assembled strips in a preforming mold having a cavity in the form of a transaxial portion of the tire, subsequently compression molding said assembly in the mold in annular toroidal form with an essentially smooth surface devoid of anti-skid pattern, disposing a shaped tire carcass containing a curing bag between two of such compression molded forms, and heating the resulting assembly under pressure in a vulcanizing mold having a tread pattern in its surface to effect vulcanization of the tire in the desired shape.

6. A method of making pneumatic tires comprising assembling a plurality of vulcanizable rubber tire stocks in the relative positions which such stocks occupy in the finished tire, placing a definite quantity of such assembled stocks in a preforming mold having a cavity in the form of a transaxial portion of the tire, said mold being comprised of a shell member and a core member, the surface of said core having less adhesion to the rubber stock than the surface of said shell, subsequently compression molding said band in annular toroidal form with an essentially smooth surface devoid of anti-skid pattern, the surface of such shell having sufficient adhesion to the rubber stock so that the stock remains on the shell when the mold is opened, disposing a shaped tire carcass containing a curing bag between two of such compression molded forms, and heating the resulting assembly under pressure to effect vulcanization thereof.

7. A method of making pneumatic tires comprising extruding a strip of rubber tire sidewall stock and an adjacent strip of rubber tread stock assembled in the relative positions which such stocks occupy in the finished tire, placing a definite quantity of such assembled strips in a preforming mold having a cavity in the form of a transaxial half of the tire, said mold being comprised of a shell member and a core member, the surface of said core having less adhesion to the rubber stock than the surface of said shell, subsequently compression molding said band in annular toroidal form with an essentially smooth surface devoid of anti-skid pattern, the surface of said shell having sufficient adhesion to the rubber stock so that the stock remains on the shell when the mold is opened, disposing a shaped tire carcass containing a curing bag between two of such compression molded forms, and heating the resulting assembly under pressure to effect vulcanization thereof.

8. The method of making pneumatic tires comprising assemblying vulcanizable rubber tire stocks in the relative positions which such stocks occupy in the finished tire, forming said assembly into an annular band having the approximate cross-sectional shape of a transaxial portion of the tire tread, subsequently compression molding said band in annular toroidal form with an essentially smooth surface devoid of anti-skid pattern in a mold comprised of a shell member and a core member, the surface of said core member having less adhesion to the rubber stock than the surface of said shell, and the surface of said shell having sufficient adhesion to the rubber stock for the compression molded form to remain on the shell member when the mold is opened, disposing a shaped tire carcass containing a curing bag between two such shell members containing such compression molded forms, bringing said shell members together over the carcass under the influence of heat and pressure to unite the compression molded forms to the carcass, the adhesion between the surface of the shell and the rubber stock being less than the adhesion of the rubber stock to the carcass, so that the compression molded forms remain on the carcass when the mold is opened, and thereafter disposing the entire assembly of carcass and rubber in a tire mold and vulcanizing the same therein.

9. A method of making pneumatic tires comprising assemblying a plurality of vulcanizable rubber tire stocks in the relative positions which such stocks occupy in the finished tire, forming said assembly into an annular band having the approximate cross-sectional shape of a transaxial portion of the tire tread, subsequently compression molding said band in annular toroidal form with an essentially smooth surface devoid of anti-skid pattern in a mold comprised of a shell member and a core member, removing said shell member from the core with the molded rubber formed therein, disposing a shaped tire carcass containing a curing bag between two such shell members containing such molded forms, bringing said shell members together over the carcass under the influence of heat and pressure to unite the molded forms to the carcass, and thereafter removing the resulting assembly of carcass and molded forms and disposing the assembly in a tire mold having a tread pattern therein, and vulcanizing the assembly in said tire mold.

10. A method of making pneumatic tires comprising assemblying a rubber tire tread stock and a rubber sidewall stock in the relative positions which such stocks occupy in the finished tire, forming said assembly into an annular band having the approximate cross sectional shape of a transaxial half of the tire tread, subsequently compression molding said band in annular toroidal form with an essentially smooth surface devoid of anti-skid pattern in a mold comprised of a shell member and a core member, the surface of said core member having less adhesion to the rubber stock than the surface of said shell, and the surface of said shell having sufficient adhesion to the rubber stock for the compression molded form to remain on the shell member when the mold is opened, disposing a shaped tire carcass containing a curing bag between two such shell members containing such compression molded forms, bringing said shell members together over the carcass under the influence of heat and pressure to unite the compression molded forms to the carcass, the adhesion between the surface of the shell and the rubber stock being less than the adhesion of the rubber stock to the carcass, so that the compression molded forms remain on the carcass when the mold is opened, and thereafter disposing the entire assembly of carcass and rubber in a tire mold and vulcanizing the assembly therein.

11. A method of making pneumatic tires comprising assemblying a rubber tire tread stock and a rubber sidewall stock in the relative positions which such stocks occupy in the finished tire, forming said assembly into an annular band having the approximate cross sectional shape of one-half of the tire treat, subsequently compression molding said band in annular form with an essentially smooth surface devoid of anti-skid pattern in a mold comprised of a shell member and a core member, removing said shell from said core with the molded band adhered to the shell, and thereafter bringing two of said shells containing such molded bands against a tire carcass to unite the molded bands to the carcass, and thereafter vulcanizing the assembly in tire shape in a mold having a tread pattern.

12. A method of making pneumatic tires comprising assemblying a rubber tire tread stock and a rubber sidewall stock in the relative positions which such stocks occupy in the finished tire, forming said assembly into an annular band, subsequently compression molding said band with a smooth surface devoid of tread pattern between a shell member and a core member, removing said shell member from said core member with the molded band contained in said shell, bringing a tire carcass into engagement with said molded band in said shell, subjecting the band and carcass to heat and pressure to unite same, and vulcanizing the assembly in tire shape.

13. A method of making pneumatic tires comprising preforming a vulcanizable rubber cap stock into a shape approximating the shape such stock will have in the completed tire, molding said preform under the influence of heat and pressure in annular form, separately preforming a vulcanizable rubber base stock into a shape approximating the shape such stock will have in the completed tire, molding said base stock preform in a separate molding operation under the influence of heat and pressure in annular form, disposing the said molded preforms over a raw tire carcass in annular toroidal form, uniting the preforms and tire carcass by application of heat and pressure, and curing the resulting assembly.

14. A method of making pneumatic tires comprising molding a vulcanizable rubber cap stock between a mold shell and a mold core defining a mold cavity having the shape of a transaxial section of a portion of a pneumatic tire, separating said mold shell from said core with said molded cap stock adhered to the shell, substituting for said core a second core defining with said shell and molded cap portion an annular cavity having the shape of a transaxial section of the base portion of a pneumatic tire casing, placing in said second cavity vulcanizable rubber base stock which becomes united with the cap stock under the influence of heat and pressure applied to the shell and second core, removing said second mentioned core with the molded cap stock and molded base stock adhered to the shell, disposing two such shells containing molded cap stock and molded base stock over a vulcanizable rubber tire carcass in annular toroidal form containing a curing bag, uniting the base stock to the surface of the carcass by application of heat and pressure, and vulcanizing the resulting assembly.

15. A method of making penumatic tires comprising molding vulcanizable rubber base stock in a mold cavity having the form of a transaxial section of the base portion of a pneumatic tire, said cavity being defined by a shell member and a core member, removing said core member from said shell member, the molded base stock remaining adhered to the shell member, disposing two such shell members containing molded base stock over a pneumatic tire carcass in annular toroidal form, uniting said base stock to the carcass by application of heat and pressure, removing said carcass from said mold shells with said molded base stock adhered to the carcass, molding vulcanizable rubber cap stock between a second shell member and a second core member defining therebetween a cavity having the shape of a transaxial section of the cap portion of a tire, removing said second shell member from said core member with the molded cap stock adhered to the shell member, disposing two such shell members containing molded cap stock over the assembly of carcass and base stock, uniting the molded cap stock to the base stock by application of heat and pressure, and vulcanizing the resulting assembly.

16. A method of making pneumatic tires comprising molding vulcanizable rubber cap stock in a mold cavity having the form of a transaxial section of the cap portion of a pneumatic tire, said cavity being defined between a shell member and a core member, removing said core member from said shell member with the molded cap stock contained in said shell member, molding vulcanizable rubber base stock in a mold cavity having the shape of a transaxial portion of the base portion of a pneumatic tire, said second cavity being defined between a second shell and a second core, removing said second core from said second shell with the molded base stock adhered to said second core, disposing said first shell containing the molded cap stock over the said second core carrying the molded base stock, uniting the said stocks by application of heat and pressure while confined between said first shell and second core, removing the second core from the first shell with the molded stocks adhered to the first shell, applying two such first shells containing molded stocks to a raw tire carcass in annular toroidal form, uniting the molded stock to the carcass by application of heat and pressure, and vulcanizing the assembly in tire form.

17. A method of making pneumatic tires comprising preforming a vulcanizable rubber cap stock into a shape approximating the shape such stock will have in the completed tire, molding said preform under the influence of heat and pressure in annular form, disposing the molded preform over a raw tire carcass in annular toroidal form, said carcass having a vulcanizable rubber sidewall stock and base stock previously applied thereto, uniting the molded cap stock to the base stock on the carcass by application of heat and pressure, and curing the resulting assembly.

18. A method of making pneumatic tires comprising molding vulcanizable rubber cap stock and base stock in the relative positions such stocks occupy in the finished tire in a cavity having the form of a transaxial section of a portion of the tire, said cavity being defined between a shell member and a core member, removing said shell member from said core member with said stocks adhered to said shell member, disposing said shell member containing said stocks over a raw tire carcass in annular toroidal form, said carcass having a strip of vulcanizable rubber sidewall stock previously applied over each of its sidewall portions, uniting the molded stocks to the carcass and to the sidewall strips by application of heat and pressure, and vulcanizing the resulting assembly.

19. A method of making pneumatic tires comprising molding in a first mold an approximate preform of vulcanizable rubber stock in the general shape of the sidewall and undertread portions of a tire, uniting the molded preform to a raw tire carcass, providing a second mold having a tread rib design therein, molding tread rib stock in said second mold, placing the assembly of raw tire carcass carrying said united molded preform in said second mold, and uniting said molded rib stock to said under-tread portion by application of heat and pressure.

20. A method of making pneumatic tires comprising molding in a first mold an approximate preform of vulcanizable rubber stock in the general shape of the sidewall and undertread portions of a tire, uniting the molded preform to a raw tire carcass, providing a second mold having a tread rib design therein, injection molding tread rib stock in said second mold, placing the assembly of raw tire carcass carrying said united molded preform in said second mold, and uniting said molded rib stock to said under-tread portion by application of heat and pressure.

HAROLD WEIGOLD.
DORR J. HINMAN.

References Cited in the file of this patent

UNITED STATES PATENTS

| Number | Name | Date |
|---|---|---|
| 1,913,330 | Brickman | June 6, 1933 |
| 2,476,884 | Maynard | July 19, 1949 |
| 2,497,226 | McNeill | Feb. 14, 1950 |
| 2,569,935 | Leguillon et al. | Oct. 2, 1951 |